(12) United States Patent
Castro

(10) Patent No.: US 12,214,725 B2
(45) Date of Patent: Feb. 4, 2025

(54) TRANSPARENT TRAILER ARTICULATION VIEW

(71) Applicant: Continental Autonomous Mobility US, LLC, Auburn Hills, MI (US)

(72) Inventor: Aranza Hinojosa Castro, Libert Hill, TX (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 0 days.

(21) Appl. No.: 17/753,485

(22) PCT Filed: Sep. 4, 2020

(86) PCT No.: PCT/US2020/049447
§ 371 (c)(1),
(2) Date: Mar. 4, 2022

(87) PCT Pub. No.: WO2021/046379
PCT Pub. Date: Mar. 11, 2021

(65) Prior Publication Data
US 2022/0371514 A1 Nov. 24, 2022

Related U.S. Application Data

(60) Provisional application No. 62/895,745, filed on Sep. 4, 2019.

(51) Int. Cl.
*B60R 1/00* (2022.01)
*B60R 1/26* (2022.01)
(Continued)

(52) U.S. Cl.
CPC ............... *B60R 1/003* (2013.01); *B60R 1/26* (2022.01); *H04N 5/265* (2013.01); *H04N 7/183* (2013.01);
(Continued)

(58) Field of Classification Search
CPC ............... B60R 1/26; B60R 2300/105; B60R 2300/303; B60R 2300/304;
(Continued)

(56) References Cited

U.S. PATENT DOCUMENTS

2016/0152263 A1* 6/2016 Singh .................... B60T 8/1708
701/41
2016/0366336 A1 12/2016 Kuehnle
(Continued)

FOREIGN PATENT DOCUMENTS

AU 2015100986 A4 9/2015
CN 110116676 A 8/2019
(Continued)

OTHER PUBLICATIONS

The International Search Report and the Written Opinion of the International Searching Authority mailed on Nov. 30, 2020 for the counterpart PCT Application No. PCT/US2020/049447.
(Continued)

*Primary Examiner* — Farzana Hossain

(57) ABSTRACT

A method for providing a panoramic view (152) of an environment behind a trailer (106) of a vehicle-trailer system (100). The method includes receiving a first image (133, 133*b*) from a rear trailer camera (132, 132*b*), a second image (133, 133*c*) from a right-side trailer camera (132, 132*c*), and a third image (133, 133*d*) from a left-side trailer camera (132, 132*d*). The method includes determining a panoramic view (152) based on the first image (133, 133*b*), the second image (133, 133*c*), and the third image (133, 133*d*). Additionally, the method includes determining a trailer angle (α) based on sensor system data (131) received from a sensor system (130). The method includes determining a viewing area (154) within the panoramic view (152) based on the
(Continued)

trailer angle (α) and sending instructions (156) to a display (122) to display the viewing area (154).

14 Claims, 7 Drawing Sheets

(51) Int. Cl.
  *H04N 5/265* (2006.01)
  *H04N 7/18* (2006.01)
  *H04N 23/698* (2023.01)

(52) U.S. Cl.
  CPC ...... *H04N 23/698* (2023.01); *B60R 2300/105* (2013.01); *B60R 2300/303* (2013.01); *B60R 2300/304* (2013.01); *B60R 2300/60* (2013.01); *B60R 2300/802* (2013.01)

(58) Field of Classification Search
  CPC .......... B60R 2300/60; B60R 2300/802; B60R 2300/202; B60R 2300/605; B60R 2300/8046; B60R 2300/8066; B60R 1/00; B60R 1/003; H04N 5/265; H04N 7/183; H04N 23/698
  See application file for complete search history.

(56) References Cited

U.S. PATENT DOCUMENTS

| | | |
|---|---|---|
| 2017/0217372 A1 | 8/2017 | Lu |
| 2018/0059896 A1* | 3/2018 | Chang ................. G06T 3/20 |
| 2019/0126851 A1 | 5/2019 | Greenwood |
| 2021/0039555 A1* | 2/2021 | Lynam ................. H04N 7/18 |

FOREIGN PATENT DOCUMENTS

| | | |
|---|---|---|
| GB | 2541906 A | 3/2017 |
| JP | 2012105158 | 5/2012 |
| JP | 2016119526 | 6/2016 |
| JP | 2018531530 | 10/2018 |
| WO | 2014130049 A1 | 8/2014 |
| WO | 2015104860 | 7/2015 |
| WO | 2018108211 | 6/2021 |

OTHER PUBLICATIONS

Notice of Reasons for Refusal from the Japan Patent Office for counterpart patent application 2021-568162, May 22, 2023.
Chinese Office Action dated Oct. 17, 2024 for the counterpart Chinese Patent Application No. 202080062090.0 and machine translation of same.

* cited by examiner

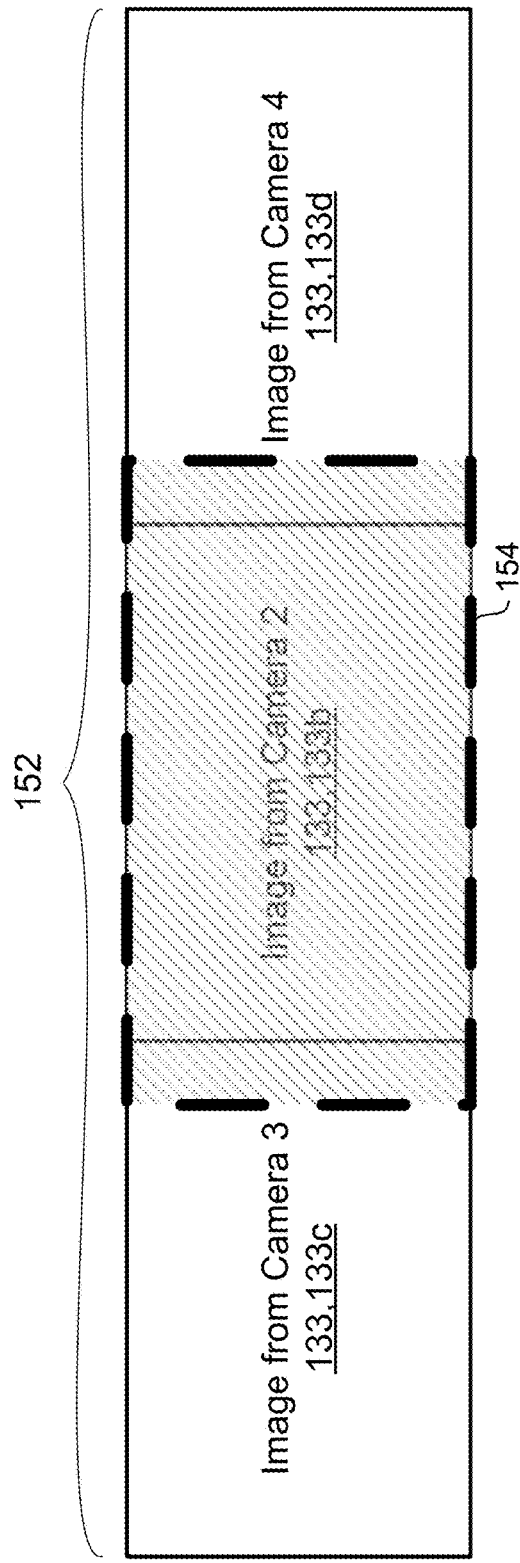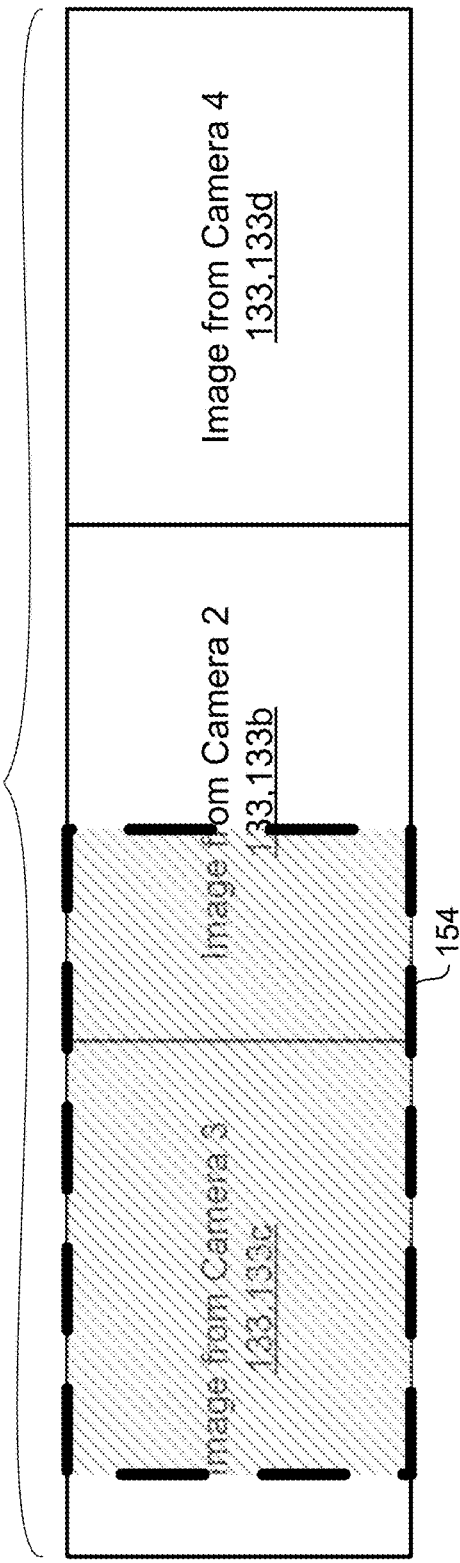
FIG. 5A
FIG. 5B

TRANSPARENT TRAILER ARTICULATION VIEW

TECHNICAL FIELD

This disclosure relates to a trailer imaging system that provides a transparent trailer articulation view of a rearward environment of a trailer attached to a tow vehicle.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Some of the challenges that face tow vehicle drivers is maneuvering the vehicle-trailer system, specifically in the rearward direction, while not being able to see behind the trailer. Therefore, it is desirable to have a system that provides the driver with a panoramic view of the rearward environment of the trailer.

SUMMARY

One aspect of the disclosure provides an example arrangement of operations for a method of providing a panoramic view of an environment behind a trailer of a vehicle-trailer system. The method includes receiving, at data processing hardware, a first image from a rear trailer camera positioned on a rear portion of the trailer. The first image captures a rearward environment of the trailer. The method includes receiving, at the data processing hardware, a second image from a right-side trailer camera positioned on a right-side portion of the trailer. The second image captures a right-side environment of the trailer. The method includes receiving, at the data processing hardware, a third image from a left-side trailer camera positioned on a left-side portion of the trailer. The third image captures a left-side environment of the trailer. The method includes determining, at the data processing hardware, a panoramic view based on the first image, the second image, and the third image. In some examples, the method determines the panoramic view by stitching the first image, the second image, and the third image. Other methods of determining the panoramic view may also be used. The method 700 includes determining, at the data processing hardware, a trailer angle based on sensor system data received from a sensor system. The trailer angle being an angle between a vehicle fore-aft axis and a trailer fore-aft axis. The method also includes determining, at the data processing hardware, a viewing area within the panoramic view based on the trailer angle. The method includes sending, from the data processing hardware to a display in communication with the data processing hardware, instructions to display the viewing area.

Implementations of disclosure may include one or more of the following optional features. In some implementations, the method also includes receiving a fourth image from a rear vehicle camera positioned on a rear portion of a vehicle of the vehicle-trailer system. The fourth image 133, 133a captures and includes a trailer representation of the trailer. The method may also include projecting the panoramic view or the viewing area of the panoramic view within a boundary of the trailer representation of the fourth image. Therefore, in some examples, the instructions to display the viewing area of the panoramic view include displaying the viewing area of the panoramic view within the boundary of the trailer representation of the fourth image.

In some examples, the rear trailer camera, the right-side trailer camera, the left-side trailer camera, and the rear vehicle camera each include a fisheye lens. The camera 132 may include other types of cameras.

In some implementations, the method also includes receiving a driver input via a user interface and adjusting the viewing area of the panoramic view displayed on the display based on the driver input. The method may include receiving a driver input via a user interface indicative of a driver request to view the panoramic view and adjusting the viewing area to include the panoramic view based on the driver input.

Another aspect of the disclosure provides a system that includes data processing hardware and memory hardware in communication with the data processing hardware. The memory hardware stores instructions that when executed on the data processing hardware cause the data processing hardware to perform operations. These operations include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 5A and 5B are perspective views of exemplary representations of a viewing area of the panoramic view shown in FIG. 3.

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It may be difficult to driver the vehicle-trailer system in a rearward direction. Therefore, it is desirable to have a system that provides the driver with a panoramic view of the rear and side of the trailer which allows the driver to have a wider range of motion because of the area the driver is able to see.

Figure 1A:
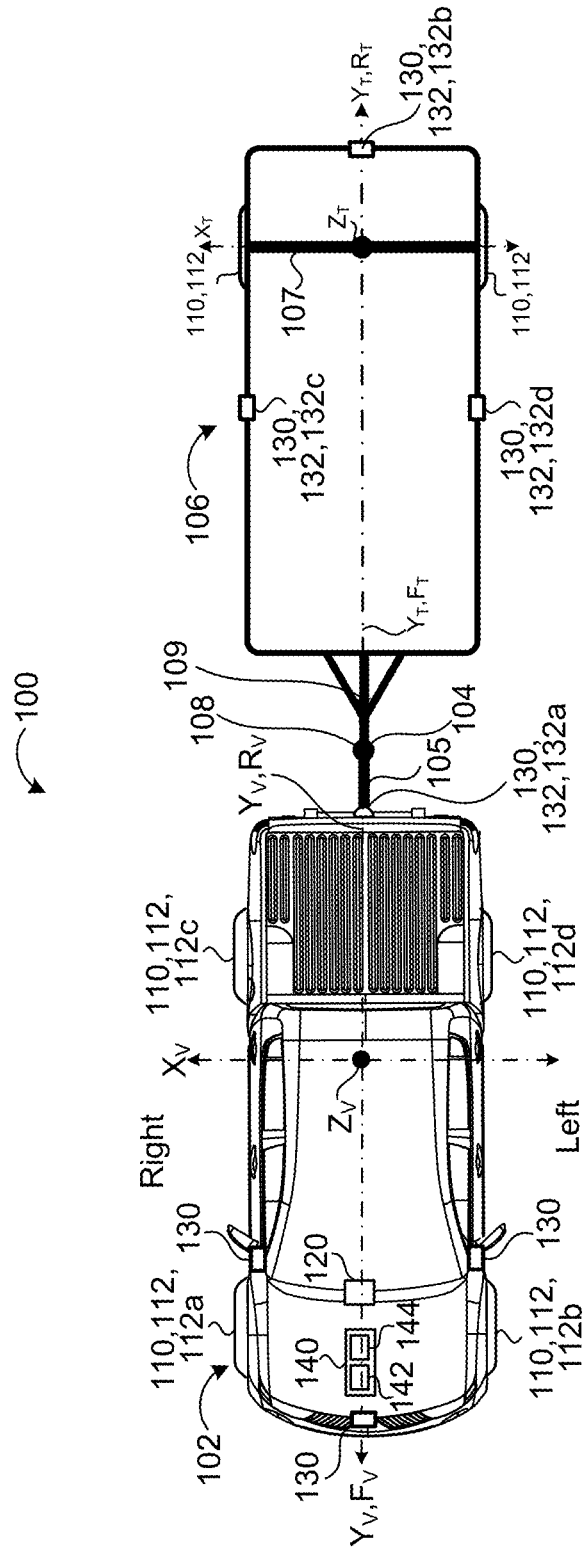
FIG. 1A is a top view of an exemplary vehicle-trailer system having a tow vehicle towing a trailer.
Figure 1B:
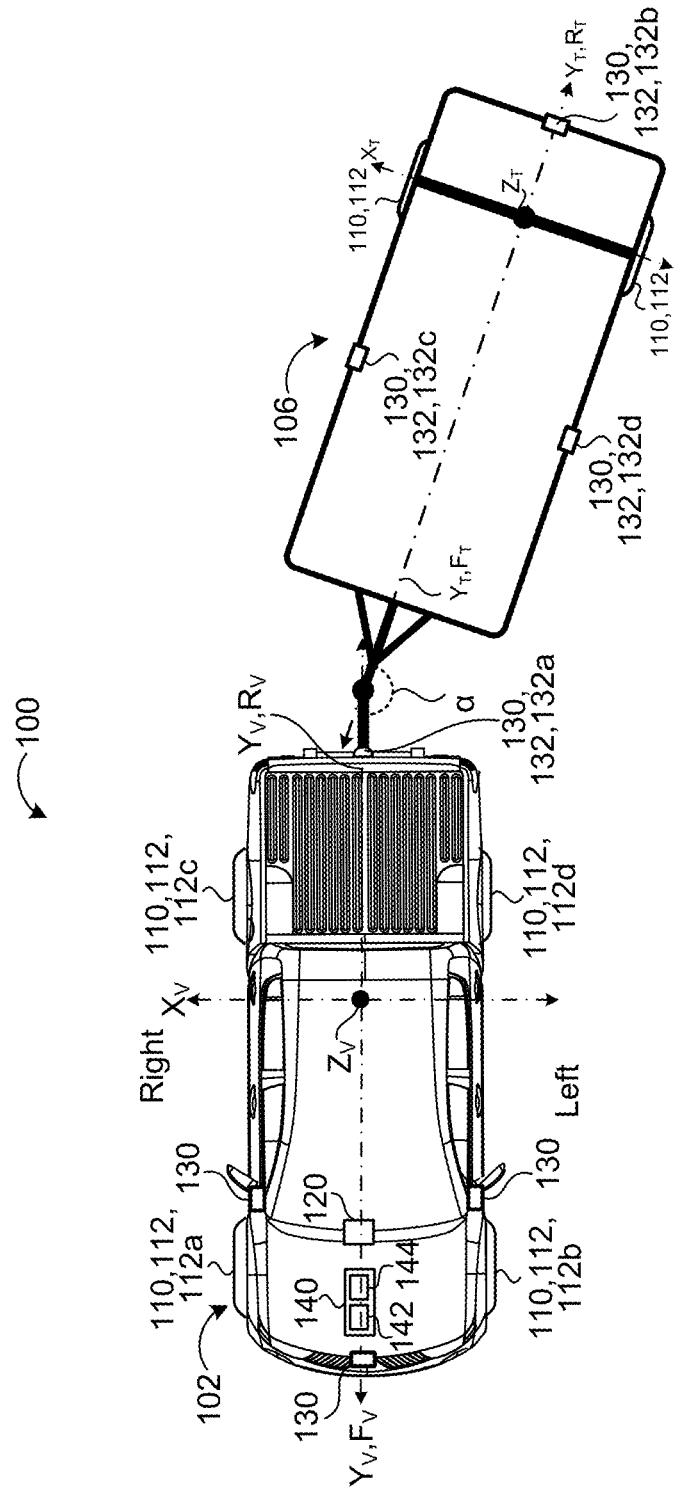
FIG. 1B is a top view of the exemplary vehicle-trailer system shown in FIG. 1A at a trailer angle between the tow vehicle and the trailer.
Figure 2:
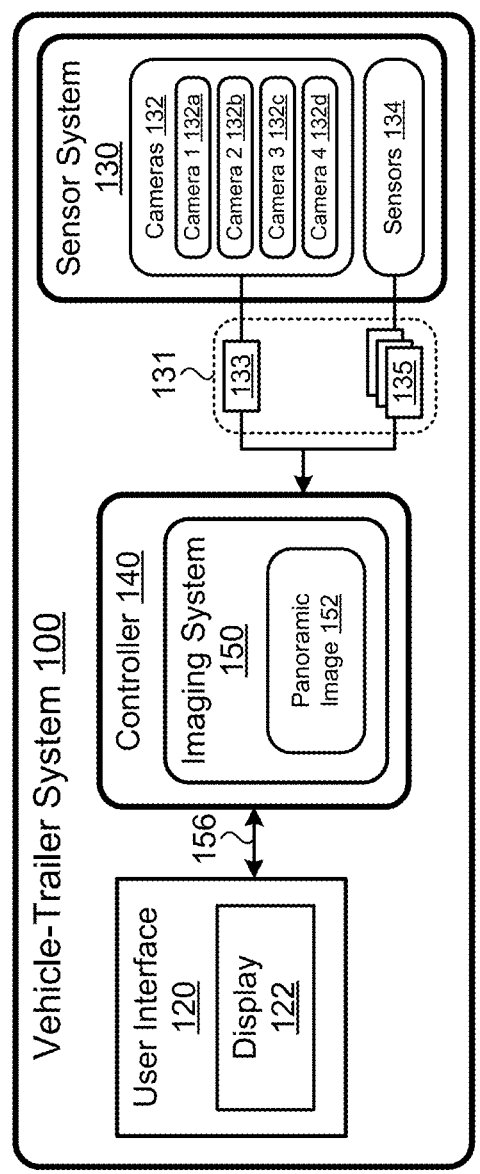
FIG. 2 is a schematic view of the exemplary vehicle-trailer system of FIG. 1A.

Referring to FIGS. 1A, 1B, and 2, in some implementations, a vehicle-trailer system 100 includes a tow vehicle 102 attached to a trailer 106. The tow vehicle 102 includes a vehicle tow ball 104 supported by a vehicle hitch bar 105. The vehicle tow ball 104 is coupled to the trailer 106 by way of a trailer hitch coupler 108 supported by a trailer hitch bar 109 of the trailer 106. The tow vehicle 102 may include a drive system 110 that maneuvers the tow vehicle 102 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system (not shown) that includes brakes associated with each wheel 112, 112a-d, and an acceleration system (not shown) that is configured to adjust a speed and direction of the tow vehicle 102. In addition, the drive system 110 may include a suspension system (not shown) that includes tires associates with each wheel 112, 112a-d, tire air, springs, shock absorbers, and linkages that connect the tow vehicle 102 to its wheels 112, 112a-d and allows relative motion between the tow vehicle 102 and the wheels 112, 112a-d.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right-side and a left-side of the tow vehicle 102. A forward drive direction along the fore-aft axis $Y_V$ is designated as Fv, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$.

Moreover, the trailer 106 follows the tow vehicle 102 across the road surface by various combinations of movements relative to three mutually perpendicular axes defined by the trailer 106: a trailer transverse axis $X_T$, a trailer fore-aft axis $Y_T$, and a trailer central vertical axis $Z_T$. The trailer transverse axis $X_T$ extends between a right-side and a left-side of the trailer 106 along a trailer turning axle 107. In some examples, the trailer 106 includes a front axle (not shown) and rear axle 107. In this case, the trailer transverse axis $X_T$ extends between a right-side and a left-side of the trailer 106 along a midpoint of the front and rear axle (i.e., a virtual turning axle). A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 106 along its trailer transverse axis $X_T$, trailer fore-aft axis $Y_T$, and trailer central vertical axis $Z_T$. Therefore, when the tow vehicle 102 makes a turn as it moves in the forward direction Fv, then the trailer 106 follows along. While turning, the tow vehicle 102 and the trailer 106 form a trailer angle α being an angle between the vehicle fore-aft axis $Y_V$ and the trailer fore-aft axis Yr.

Figure 6:
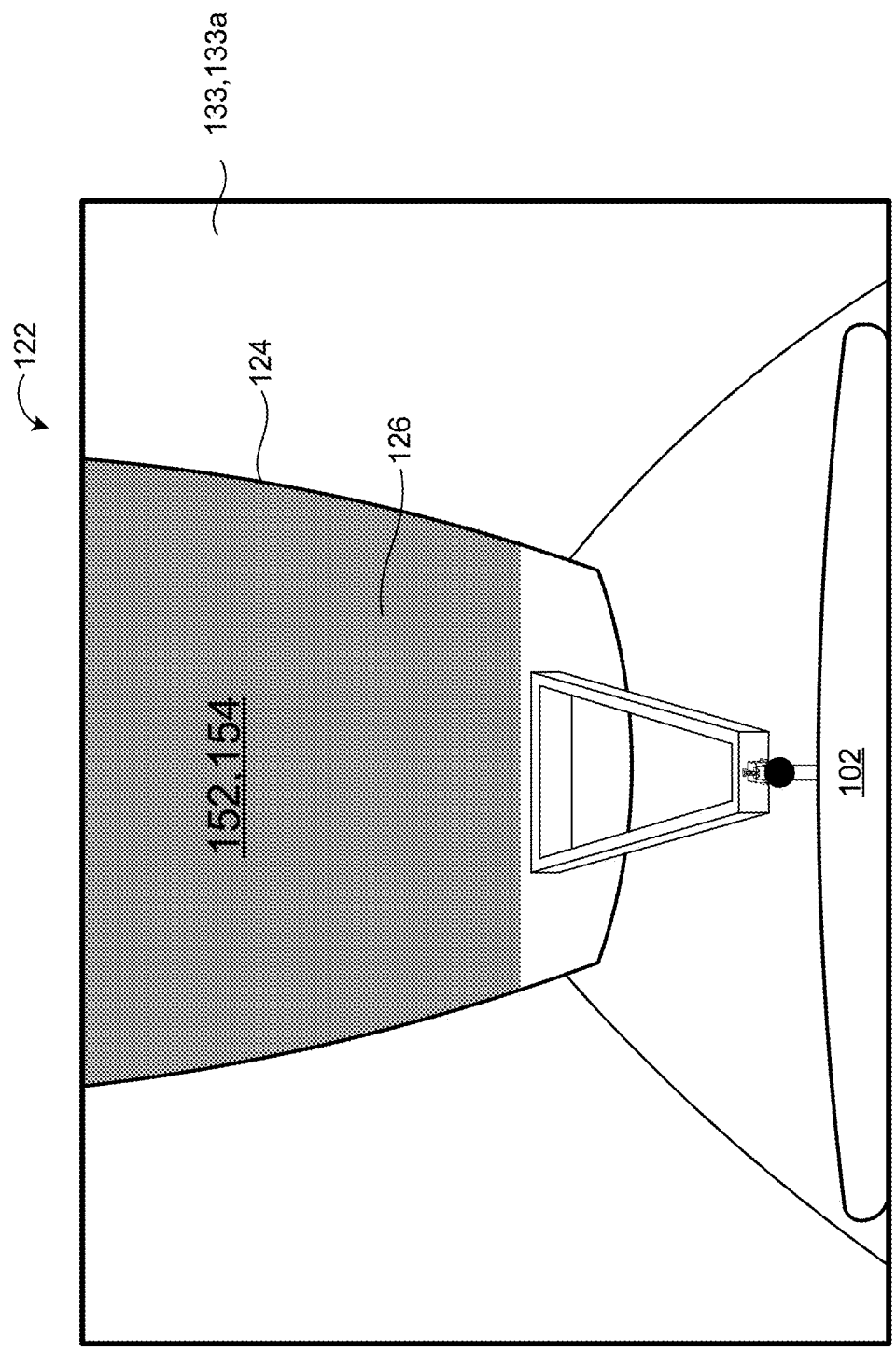
FIG. 6 is a perspective view of an exemplary representation of an image captured by the rear vehicle camera with the panoramic view projected within the boundaries of a trailer representation within the image.
Figure 7:
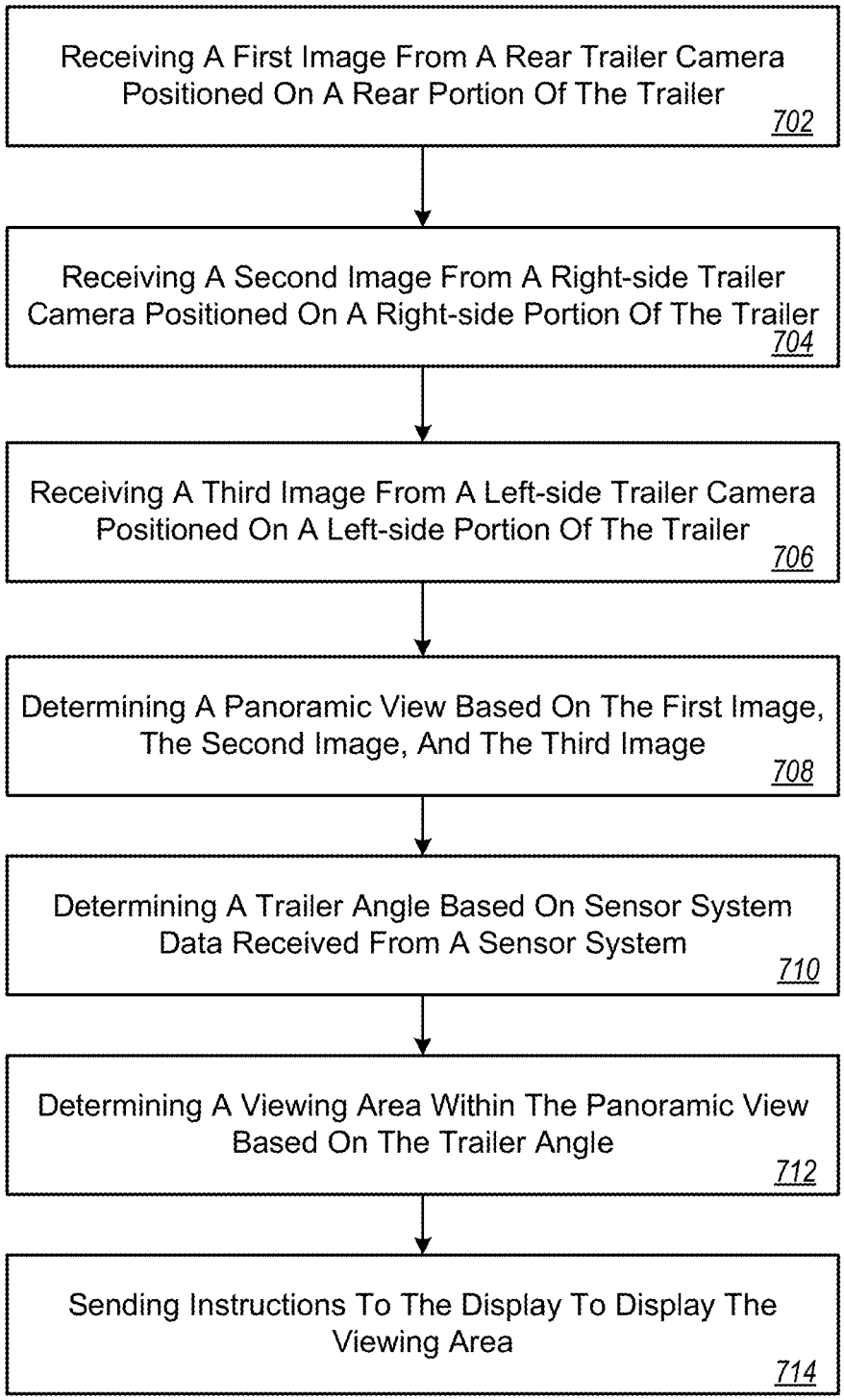
FIG. 7 is a schematic view of an exemplary arrangement of operations for a method that generates a panoramic view of a rear environment of a trailer attached to a tow vehicle.

The tow vehicle 102 may include a user interface 120. The user interface 120 may include a display 122, a knob, and a button, which are used as input mechanisms. In some examples, the display 122 may show the knob and the button. While in other examples, the knob and the button are a knob button combination. In some examples, the user interface 120 receives one or more driver commands from the driver via one or more input mechanisms or a touch screen display 122 and/or displays one or more notifications to the driver. The user interface 120 is in communication with a controller 140. In some examples, the display 122 displays an image 133 of an environment of the tow vehicle 102 which includes the trailer articulation view 152 as shown in FIG. 6.

The tow vehicle 102 may include a sensor system 130 to provide reliable and robust driving. The sensor system 130 may include different types of sensors that may be used separately or with one another to create a perception of the environment of the tow vehicle 102 and the trailer 106 that is used for the tow vehicle 102 to drive and aid the driver in make intelligent decisions based on objects and obstacles detected by the sensor system 130. The sensor system 130 may include the one or more cameras 132, 132a-d supported by the vehicle-trailer system 100. In some implementations, the tow vehicle 102 includes a rear vehicle camera 132a (i.e., a first camera) that is mounted to provide a view of a rear-driving path for the tow vehicle 102, or in other words, the rear vehicle camera 132a captures images 133 of a rear environment of the tow vehicle 102. Additionally, the sensor system 130 includes a trailer rear camera 132b (i.e., a second camera) that is mounted to provide a view of a rear-driving path for the trailer 106, or in other words, the rear trailer camera 132b captures images 133 of a rear environment of the trailer 106. In some examples, the sensor system 130 also includes side trailer camera 132c, 132d (i.e., third camera and fourth camera) each mounted to provide a side images 133 of the side environment of the trailer 106. In some examples, additional one or more cameras 132 are positioned on a front of the tow vehicle 102 to capture a forward-driving path of the tow vehicle 102 and/or on the sides of the tow vehicle 102 to capture a side environment of the tow vehicle 102.

In some implementation, the rear vehicle camera 132a, the rear trailer camera 132b, and the side trailer cameras 132c, 132d include a fisheye lens having an ultra-wide-angle lens that produces strong visual distortion intended to create a wide panoramic or hemispherical image. Fisheye cameras capture images having an extremely wide angle of view. Moreover, images captured by the fisheye camera have a characteristic convex non-rectilinear appearance. Other types of cameras may also be used to capture the images 133.

The sensor system 130 may also include other sensors 134 that detect the vehicle motion, i.e., speed, angular speed, position, etc. The other sensors 134 may include an inertial measurement unit (IMU) configured to measure the vehicle's linear acceleration (using one or more accelerometers) and rotational rate (using one or more gyroscopes). In some examples, the IMU also determines a heading reference of the tow vehicle 102. Therefore, the IMU determines the pitch, roll, and yaw of the tow vehicle 102. The other sensors 134 may also include, but are not limited to, radar, sonar, LIDAR (Light Detection and Ranging, which can entail optical remote sensing that measures properties of scattered light to find range and/or other information of a distant target), LADAR (Laser Detection and Ranging), ultrasonic, HFL (High Resolution 3D Flash LIDAR), etc. In some implementations, the sensor system 130 may provide external sensor data received from other systems or vehicles, such as by way of V2X communication or any other communication.

The controller 140 includes a computing device (or processor) 142 (e.g., central processing unit having one or more computing processors) in communication with non-transitory memory 144 (e.g., a hard disk, flash memory, random-access memory) capable of storing instructions executable on the computing processor(s) 142. The controller may be supported by the tow vehicle 102, the trailer 106, or both the tow vehicle 102 and the trailer 106. In some examples, the controller 140 executes an imaging system 150 that provides the driver of the tow vehicle 102 with a panoramic view 152 of the environment behind the trailer 106.

The imaging system 150 receives images 133 from one or more camera 132 and provides a panoramic view 152 of the rear environment of the trailer 106. The imaging system 150 solves the difficulties that the driver faces when backing up the vehicle-trailer system 100 by showing a panoramic view 152 of the rear environment of the trailer 106 on the display 122. The panoramic view 152 includes images 133 captured by the rear trailer camera 132b and the side trailer cameras 132c, 132d. The panoramic view 152 may be stitched to or overlain on an image 133a captured by the rear vehicle camera 132a within a boundary 124 of a trailer representation 126 on the display 122 as shown in FIG. 6.

Figure 3:
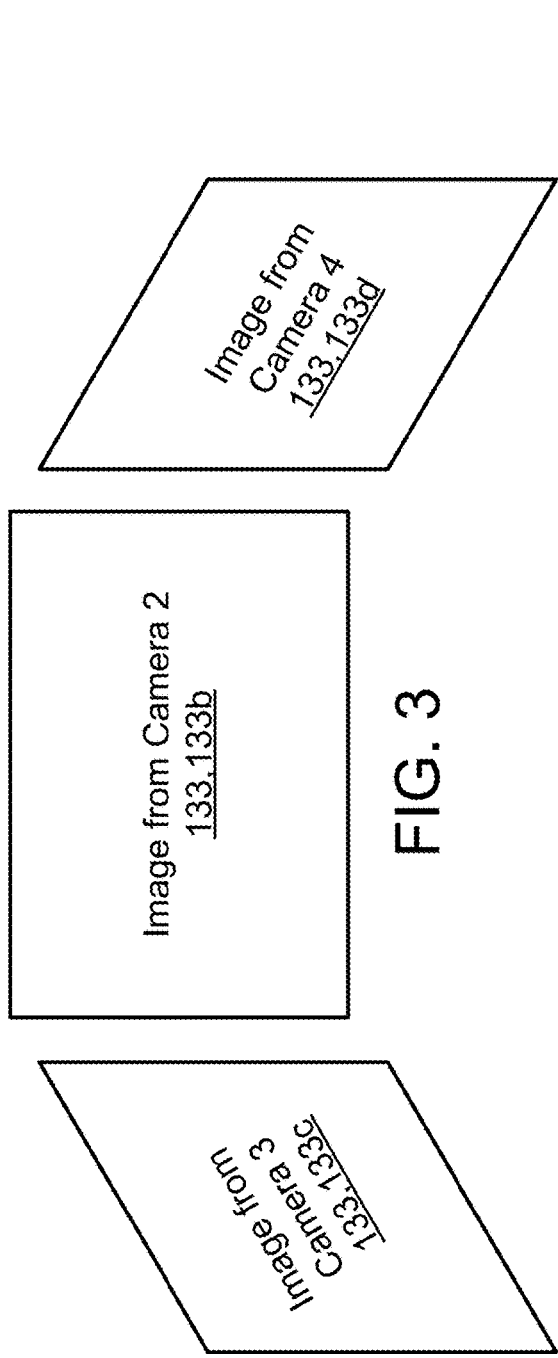
FIG. 3 is a perspective view of images captures by a rear trailer camera and the side trailer cameras based on mounting location.
Figure 4:
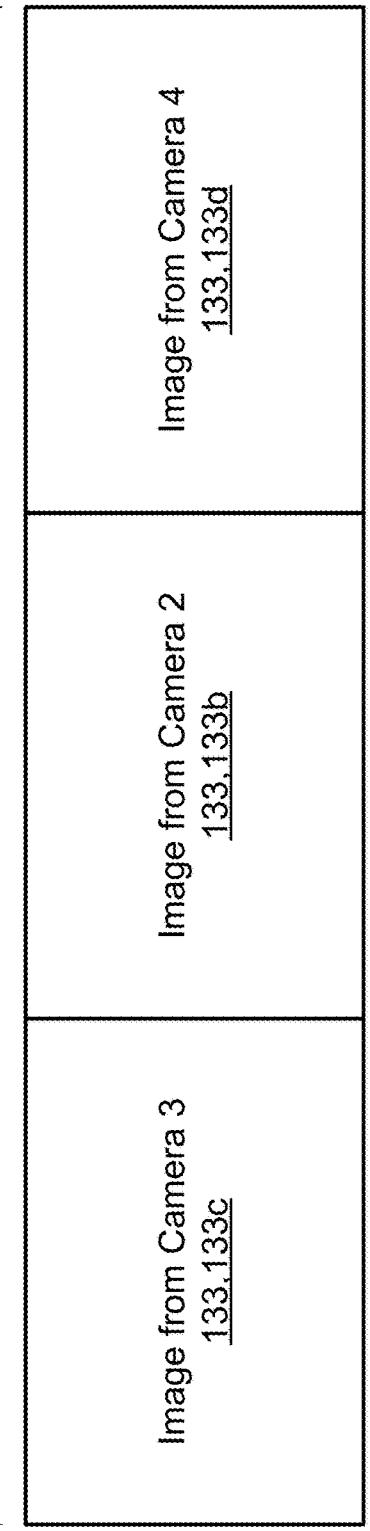
FIG. 4 is a perspective view of an exemplary representation of a panoramic view of the images shown in FIG. 3.

Referring to FIG. 3, the imaging system 150 receives images 133, 133b from the rear trailer camera 132b (i.e., second camera), images 133, 133c from the right-side trailer camera 132c, and images 133, 133d from the left-side trailer camera 132d. The imaging system 150 stitches the received images 133b, 133c, 133d to create a panoramic view 152 shown in FIG. 4. In some examples, the panoramic view 152 is displayed on the display 122. In other examples, the panoramic view 152 is displayed within the boundary 124 of the trailer representation 126 of an image 133a captured by the rear vehicle camera 132a on the display 122 as shown in FIG. 6. In other words, the display 122 shows the image 133a captured by the rear vehicle camera 132a and projects the panoramic view 152 onto a trailer body representation of the trailer 106 within the image 133a.

Referring to FIGS. 5A and 5B, in some implementations, the controller 140 determines the trailer angle α based on sensor system data 131 from the sensor system 130. For example, the controller 140 determines the trailer angle α based on one or more images 133a received from the rear vehicle camera 132a and/or images received from a camera positioned on a front portion of the trailer 106. Additionally or alternatively, the controller 140 may determine the trailer angle α based on sensor data 134 received from one or more sensors 134 supported by the rear vehicle and/or the front portion of the trailer 106.

In some implementations, the imaging system 150 selects a viewing area 154 of the panoramic view 152 for display based on the trailer angle α. For example, referring to FIG. 5A, when the tow vehicle 102 is moving in a straight direction (forward or backward), then the imaging system 150 selects the viewing area 154 of the panoramic view 152 that includes the image 133b from the rear trailer camera 132b and a section of each of the side images 133c, 133d captured by the side trailer cameras 132c, 132d. Referring to FIG. 5B, when the tow vehicle 102 is turning towards the right (forward or backward direction), then the imaging system 150 selects the viewing area 154 of the panoramic view 152 that includes the image 133c (or a section thereof) from the right-side trailer camera 132c and a section of the image 133b from the rear trailer camera 132b. Similarly, when the tow vehicle 102 is turning towards the left (forward or backward direction), then the imaging system 150 selects the viewing area 154 of the panoramic view 152 that includes the image 133d (or a section thereof) from the left-side trailer camera 132d and a section of the image 133b from the rear trailer camera 132b. The imaging system 150 utilizes the trailer angle α to scroll the panoramic view 154 and display a natural image or viewing area 154 to the driver while driving in reverse as shown in FIGS. 5A and 5B.

In some implementations, the driver may adjust the viewing area 154 displayed on the display 122 by way of the user input 120. Therefore, the driver may adjust the viewing area 154 shown in FIG. 5A to view more of the image 133c captured by the right-side trailer camera 132c as shown in FIG. 5B. Other adjustments may also be possible.

FIG. 5 provides an example arrangement of operations for a method 700 of providing a panoramic view 152 of an environment behind a trailer 106 of a vehicle-trailer system 100 shown in FIGS. 1A-6. At block 702, the method 700 includes receiving, at data processing hardware 140, 142, a first image 133, 133b from a rear trailer camera 132, 132b positioned on a rear portion of the trailer 106. The first image 133, 133b captures a rearward environment of the trailer 106. At block 704, the method 700 includes receiving, at the data processing hardware 140, 142, a second image 133, 133c from a right-side trailer camera 132, 132c positioned on a right-side portion of the trailer 106. The second image 133, 133c captures a right-side environment of the trailer 106. At block 706, the method 700 includes receiving, at the data processing hardware 140, 142, a third image 133, 133d from a left-side trailer camera 132, 132d positioned on a left-side portion of the trailer 106. The third image 133, 133c captures a left-side environment of the trailer 106. At block 708, the method 700 includes determining, at the data processing hardware 140, 142, a panoramic view 152 based on the first image 133, 133b, the second image 133, 133c, and the third image 133, 133d. In some examples, the method 700 determines the panoramic view 152 by stitching the first image 133, 133b, the second image 133, 133c, and the third image 133, 133d. Other methods of determining the panoramic view may also be used. At block 710, the method 700 includes determining, at the data processing hardware 140, 142, a trailer angle α based on sensor system data 131 received from a sensor system 130. The trailer angle α being an angle between a vehicle fore-aft axis $Y_V$ and a trailer fore-aft axis $Y_T$. At block 712, the method 700 includes determining, at the data processing hardware 140, 142, a viewing area 154 within the panoramic view 152 based on the trailer angle α. At block 714, the method 700 includes sending, from the data processing hardware 140, 142 to a display 122 in communication with the data processing hardware 140, 142, instructions 156 to display the viewing area 154.

In some implementations, the method 700 also includes receiving a fourth image 133, 133a from a rear vehicle camera 132, 132a positioned on a rear portion of a vehicle 102 of the vehicle-trailer system 100. The fourth image 133, 133a captures and includes a trailer representation 126 of the trailer 106. The method 700 may also include projecting the panoramic view 152 or the viewing area 154 of the panoramic view 152 within a boundary 124 of the trailer representation 126 of the fourth image 133, 133a. Therefore, in some examples, the instructions 156 to display the viewing area 154 of the panoramic view 152 include displaying the viewing area 154 of the panoramic view 152 within the boundary 124 of the trailer representation 126 of the fourth image 133, 133a.

In some examples, the rear trailer camera 132, 132b, the right-side trailer camera 132, 132c, the left-side trailer camera 132, 132d, and the rear vehicle camera 132, 132a each include a fisheye lens. The camera 132 may include other types of cameras 132.

In some implementations, the method 700 also includes receiving a driver input via a user interface 120 and adjusting the viewing area 154 of the panoramic view 152 displayed on the display 122 based on the driver input. The method 700 may include receiving a driver input via a user interface 120 indicative of a driver request to view the panoramic view 152 and adjusting the viewing area 154 to include the panoramic view 152 based on the driver input.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of determining a panoramic view of an environment behind a trailer of a vehicle-trailer system, the method comprising:
    receiving, at data processing hardware, a first image from a rear trailer camera positioned on a rear portion of the trailer;
    receiving, at the data processing hardware, a second image from a right-side trailer camera positioned on a right-side portion of the trailer;
    receiving, at the data processing hardware, a third image from a left-side trailer camera positioned on a left-side portion of the trailer;
    determining, at the data processing hardware, a panoramic view based on the first image, the second image, and the third image;
    determining, at the data processing hardware, a trailer angle based on sensor system data received from a sensor system;
    determining, at the data processing hardware, a viewing area within the panoramic view based on the trailer angle;
    sending, from the data processing hardware to a display in communication with the data processing hardware, instructions to display the viewing area;
    receiving a fourth image from a rear vehicle camera positioned on a rear portion of a vehicle of the vehicle-trailer system, the fourth image including a trailer representation of the trailer; and
    forming a fifth image by projecting at least the viewing area of the panoramic view only within a boundary of the trailer representation of the fourth image such that no part of the viewing area is projected outside of the boundary of the trailer representation;

wherein the instructions to display the viewing area of the panoramic view comprises instructions for displaying the fifth image.

2. The method of claim 1, wherein determining the panoramic view based on the first image, the second image, and the third image comprises:
stitching the first image, the second image, and the third image.

3. The method of claim 1, wherein the rear trailer camera, the right-side trailer camera, the left-side trailer camera each includes a fisheye lens.

4. The method of claim 1, further comprising receiving, at the data processing hardware, a driver input via a user interface; and adjusting the viewing area of the panoramic view displayed on the display based on the driver input so as to include in the viewing area an increased amount of the second image and a decreased amount of at least one of the first image and the third image.

5. The method of claim 1, further comprising receiving, at the data processing hardware, a driver input via a user interface indicative of a driver request to view the panoramic view; and adjusting, at the data processing hardware, the viewing area to include the panoramic view based on the driver input so as to include in the viewing area an increased amount of the third image and a decreased amount of at least one of the first image and the second image.

6. A system for providing a panoramic view of an environment behind a trailer of a vehicle-trailer system, the system comprising:
a display;
data processing hardware in communication with the display;
memory hardware in communication with the data processing hardware, the memory hardware storing instructions that when executed on the data processing hardware cause the data processing hardware to perform operations comprising:
receiving a first image from a rear trailer camera positioned on a rear portion of the trailer;
receiving a second image from a right-side trailer camera positioned on a right-side portion of the trailer;
receiving a third image from a left-side trailer camera positioned on a left-side portion of the trailer;
determining a panoramic view based on the first image, the second image, and the third image;
determining a trailer angle based on sensor system data received from a sensor system;
determining a viewing area within the panoramic view based on the trailer angle;
sending instructions to the display to display the viewing area;
receiving a fourth image from a rear vehicle camera positioned on a rear portion of a vehicle of the vehicle-trailer system, the fourth image including a trailer representation of the trailer; and
generating a fifth image by projecting at least the viewing area of the panoramic view only within a boundary of the trailer representation of the fourth image such that no part of the viewing area is projected outside of the boundary of the trailer representation,
wherein the instructions to display the viewing area of the panoramic view include instructions for displaying the fifth image.

7. The system of claim 6, wherein determining the panoramic view based on the first image, the second image, and the third image comprises:
stitching the first image, the second image, and the third image.

8. The system of claim 6, wherein the rear trailer camera, the right-side trailer camera, the left-side trailer camera each includes a fisheye lens.

9. The system of claim 6, wherein the operations further comprise receiving a driver input via a user interface; and adjusting the viewing area of the panoramic view displayed on the display based on the driver input so as to include in the viewing area an increased amount of the second image and a decreased amount of at least one of the first image and the third image.

10. The system of claim 6, wherein the operations further comprise receiving a driver input via a user interface indicative of a driver request to view the panoramic view; and adjusting the viewing area to include the panoramic view based on the driver input so as to include in the viewing area an increased amount of the third image and a decreased amount of at least one of the first image and the second image.

11. A computer program product comprising a non-transitory computer-readable medium having program code instructions which, when executed by data processing hardware, cause the data processing hardware to perform operations comprising:
receiving a first image from a rear trailer camera positioned on a rear portion of the trailer;
receiving a second image from a right-side trailer camera positioned on a right-side portion of the trailer;
receiving a third image from a left-side trailer camera positioned on a left-side portion of the trailer;
determining a panoramic view based on the first image, the second image, and the third image;
determining a trailer angle based on sensor system data received from a sensor system;
determining a viewing area within the panoramic view based on the trailer angle;
sending instructions to the display to display the viewing area;
receiving a fourth image from a rear vehicle camera positioned on a rear portion of a vehicle of the vehicle-trailer system, the fourth image including a trailer representation of the trailer; and
generating a fifth image by projecting at least the viewing area of the panoramic view only within a boundary of the trailer representation of the fourth image;
wherein the instructions to display the viewing area of the panoramic view include instructions for displaying the fifth image.

12. The computer program product of claim 11, wherein the operations further comprise:
receiving a driver input via a user interface; and
adjusting the viewing area of the panoramic view displayed on the display based on the driver input so as to include in the viewing area an increased amount of the second image and a decreased amount of at least one of the first image and the third image.

13. The computer program product of claim 11, wherein the operations further comprise:
receiving, at the data processing hardware, a driver input via a user interface indicative of a driver request to view the panoramic view; and
adjusting, at the data processing hardware, the viewing area to include the panoramic view based on the driver input so as to include in the viewing area an increased amount of the third image and a decreased amount of at least one of the first image and the second image.

14. The computer program product of claim 11, wherein in generating the fifth image, no part of the panoramic view is projected outside of the trailer representation.

\* \* \* \* \*